United States Patent

[11] 3,628,302

| [72] | Inventor | John T. Roberts<br>Simpsonville, S.C. |
|---|---|---|
| [21] | Appl. No. | 9,869 |
| [22] | Filed | Feb. 9, 1970 |
| [45] | Patented | Dec. 21, 1971 |
| [73] | Assignee | W. R. Grace & Co.<br>Duncan, S.C. |

[54] BAG PACKAGING SYSTEM
7 Claims, 23 Drawing Figs.

[52] U.S. Cl. ................................. 53/59,
53/67, 53/187, 53/112 B, 53/385
[51] Int. Cl. ........................................ B65b 57/02,
B65b 31/04
[50] Field of Search ............................................ 53/59, 67,
187, 112 B, 385

[56] References Cited
UNITED STATES PATENTS

| 3,244,278 | 4/1966 | Weprin et al. ................ | 53/59 W X |
| 3,228,173 | 1/1966 | Reynolds ..................... | 53/385 |

Primary Examiner—Travis S. McGehee
Attorneys—John J. Toney, William D. Lee, Jr. and Edward J. Hanson, Jr.

ABSTRACT: Apparatus and method for classifying products to be packaged, distributing the classified products to index positions corresponding to their classifications and holding the classified products for packaging, indexing bags into product loading positions corresponding to the index positions by conveying imbricated taped bags into loading positions keyed to the classifications, inflating the taped bags, inserting the indexed items into the bags and removing the loaded bags from the loading position, conveying the loaded bags to an evacuating and closing position, evacuating and closing the bags and subsequently shrinking the bags.

INVENTOR
JOHN T. ROBERTS
BY Edward J Hanson Jr
ATTORNEY

INVENTOR
JOHN T. ROBERTS
BY *Edward J. Hanson Jr.*
ATTORNEY

INVENTOR:
JOHN T. ROBERTS

BY: Edward J. Hanany
ATTORNEY

INVENTOR
JOHN T. ROBERTS
BY Edward J Hanson
ATTORNEY

PATENTED DEC 21 1971 3,628,302
SHEET 09 OF 12
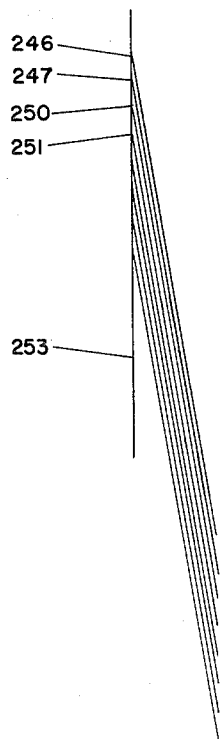
FIG. 11
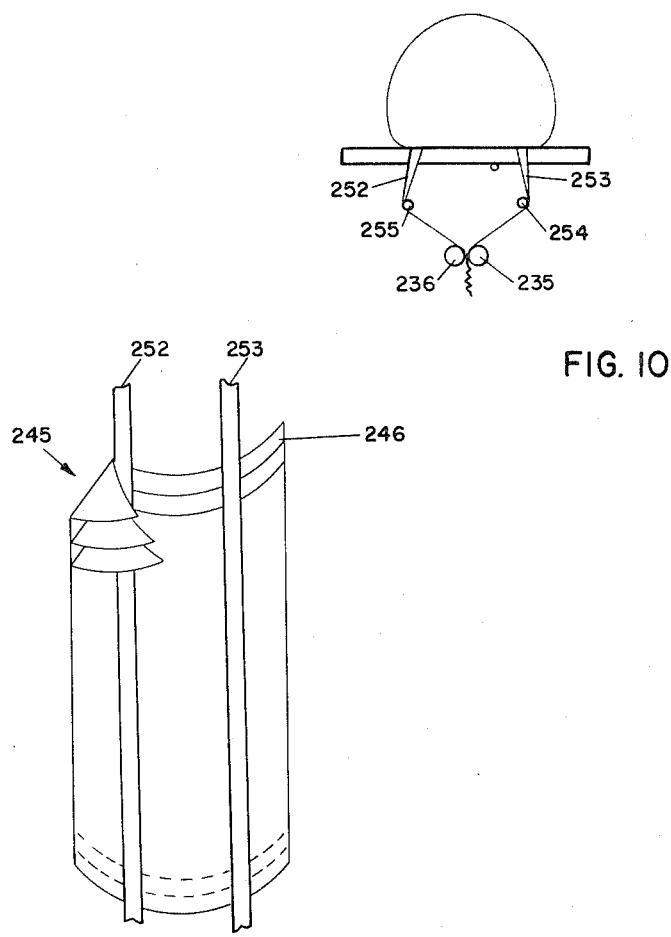
FIG. 10
FIG. 12
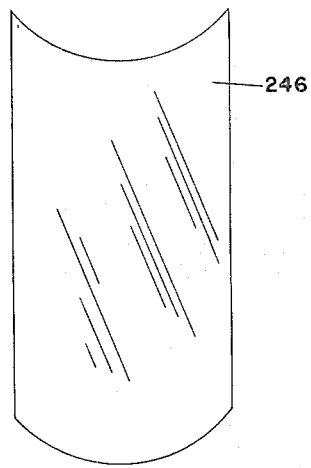
FIG. 13
INVENTOR:
JOHN T. ROBERTS
BY: Edward J. Hanson
ATTORNEY INVENTOR
JOHN T. ROBERTS
BY Edward J. Hanson Jr.
ATTORNEY

INVENTOR:
JOHN T. ROBERTS

INVENTOR:
JOHN T. ROBERTS

BY: *Edward J. Hanson*
ATTORNEY

BAG PACKAGING SYSTEM

My invention relates to packing apparatus and methods for packaging and more particularly to the classification of items and their packaging according to classification.

It is an object of my invention to provide a new and improved package classification apparatus.

It is another object of my invention to provide an improved bag positioning apparatus.

It is a still further object of my invention to provide an improved bag opening apparatus.

A further object of my invention to provide an improved bag loading apparatus.

It is a still further object of this invention to provide such apparatus in a system whereby a random group of products to be packaged may be feed into the system, classified, and loaded into bags keyed to the classification, vacuumized, clipped and shrunk in a most expeditious manner.

It is a further object of this invention to provide such a system that is economical to manufacture and economical in operation.

It is a further object of this invention to provide such a system that lends itself to operation by unskilled operators and requires the least possible manual manipulation of the product commenserate with the expense of operation and cost of equipment.

It is a further object of this invention to provide an advantageous method for classifying products and putting them into individual bags keyed to the classification of the products and subsequently vacuumizing, clipping and shrinking the bags tightly down on the product to provide a pleasing package.

In certain applications, it is desirable, to feed a random assortment of items to be packaged, such as poultry products, have the items automatically classified according to a standard such as the weight of the individual products and then deliver these classified products to loading stations in a manner allowing manual operators to have a small but continuous supply of the products always available for packaging. In such operations it is also desirable to have the appropriate bags individually indexed into positions corresponding to the classified products for loading by the operators and to have a bag delivered to the loading station and automatically opened immediately upon removal of a previous bag and to provide an easy procedure involving the least possible manual manipulation of the product both into the bag and of the loaded bag away from the loading station. Such packages are desirably vacuumized and clipped and thereafter passed through the heat shrink tunnel to shrink the vacuumized bags tightly down onto the product to provide a pleasing package. The package product is then usually moved to a station for chilling and boxing for shipment. It is of course desirable that this procedure be carried out with the consumption of the least possible plant space.

Further aspects of the present invention will become apparent hereinafter and the specification concludes with claims particularly pointing out and distinctly claiming the subject matter that I regard as my invention. The invention however as to organization and method of operation together with other objects and advantages, can best be understood by referring to the following description when taken in conjunction with the accompanying drawings.

FIG. 10 is a diagrammatic representation in side elevation view of a portion of the apparatus of FIG. 9 with a bag held in inflated position thereon.

FIG. 11 is a diagrammatic representation in side elevation view of a package of taped imbricated bags used with my invention.

FIG. 12 is a diagrammatic representation in rear elevation view of the bags in FIG. 11.

FIG. 13 is a diagrammatic representation in plan view of an individual bag of FIGS. 11 and 12.

Figure 1:
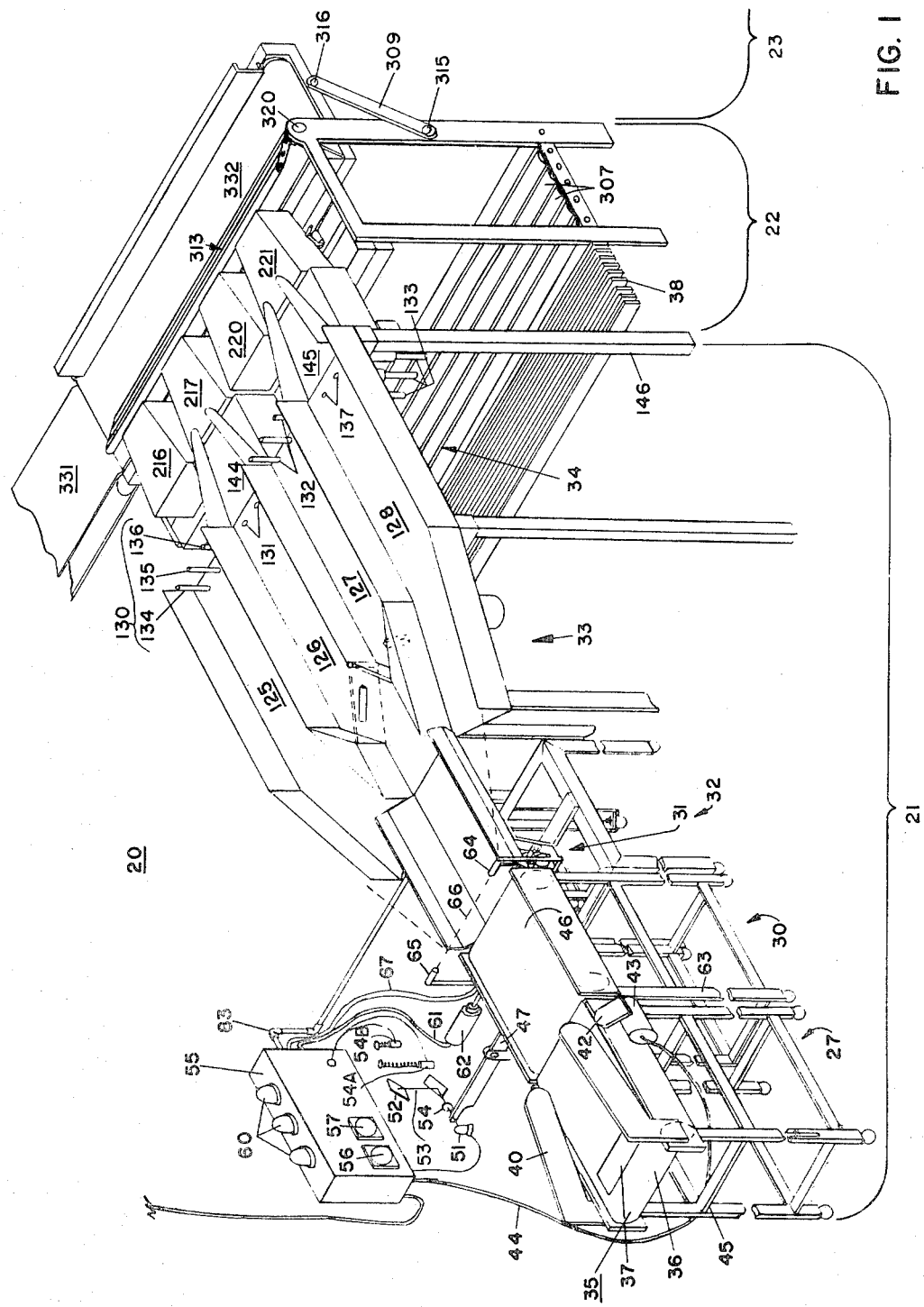
FIG. 1 is a diagrammatic representation in perspective view of a portion of the packaging system of my invention.
Figure 2:
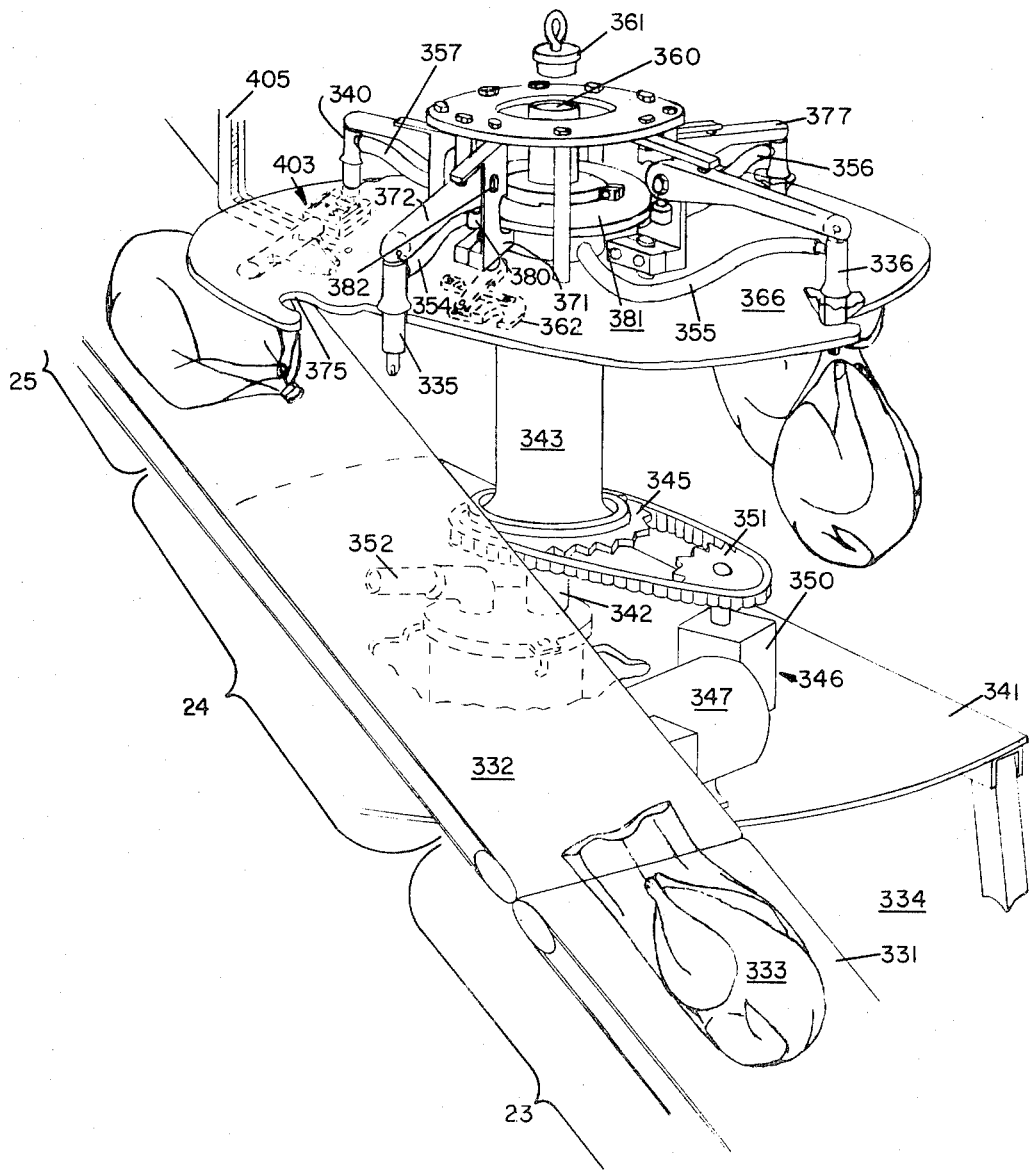
FIG. 2 is a diagrammatic representation in perspective view of the next adjoining portion of my package system.
Figure 3:
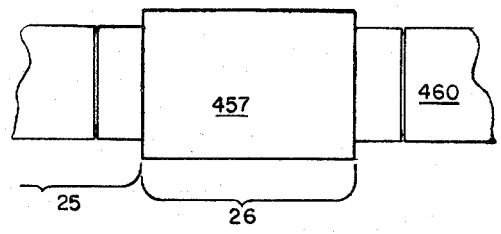
FIG. 3 is a diagrammatic representation in plan view of the downstream end portion of my packaging system.

Referring now to the drawings and in particular to FIGS. 1, 2, and 3, a preferred embodiment of the semiautomatic packaging machine or apparatus 20 is shown therein. The apparatus 20 includes a classifier 21, a bag loader 22, a bagged product conveyor 23, a vacuumizing and closing device 24, a prepared package conveyor 25, and a shrink tunnel 26 as its major components.

The classifier 21 is shown in FIGS. 1, 4, 5 and 6 to include an input timing or spacer belt conveyor means 27, a classifying conveyor sizer 30, an electronic eye sensing and initiating signalling trigger means 31, a pivotal gravity feed diverter chute means 32, indexing classified product receiver means 33, and a plurality of gravity feed product inventory chute dispenser means 34. The input timing means 27 includes a timing belt 35 having its conveying surface at least one half ft. and more preferably at least about 1 foot above the main manual working level of the packaging machine 20 which level is considered to generally correspond to the level of the bagged product conveyor 23. Generally the bag loading work surface is about three fourths of the way down from the level of the upper surface of the timing belt 35. The platform or walk 38 would be raised off the floor about one fourth the difference between the height of the timing belts upper working surface 26 and the main working level. For example, the usual main manual working level is 32–40 inches, the platform 38 is 9½–17 inches off of the floor, the gravity feed diverter chute means 34 is sloped at an angle of from 8°–15°. For fresh poultry, with surface fat or moisture, the preferred slope is 8°

+ or −1°. The bagging work level at bag loader 22 is 39–47 inches and the timing belt 35 is 62–70 inches off of the floor. A marking indicia providing marked position time feed sequence or signaling means 37 on the conveying surface 36 of the timing belt conveyor 35 indicates to or signals an operator when to load a product to be packaged into the packaging machine 20. Depending on the length of the belt and the speed of operation the timing belt 35 can of course have one or more signalling indicia thereon. The marking indicia shown is a single painted rectangular area of which two are provided (only one shown) at evenly spaced intervals on the conveying surface 36 of the timing belt. Spring guide arms 40 and 41 aid the operator in placing the product to be packaged directly onto the proper indicia position 37 if the machine is to be manually loaded. A switch 42 is provided to shut off the power to electric motor 43 and stop the timing belt 35 to stop the infeed of products by the timing belt when desired or should a situation arise necessitating such action. Switch 42 has a large hand engaging surface so that an operator may hit it easily should a defective product be fed onto the belt 35 or should the product ahead fail to clear and start backing up for example. Electric cord 44 supplies electric current to the motor 43. It may be seen that the timing belt 35 may be shutdown without shutting off the classifying conveyor sizer 30. The timing belt 35 is of the conventional slide belt type and is of course supported on a frame 45.

The classifying conveyor sizer 30 is a differentiating means equipped to classify the input product into a plurality of classifications. The sizer 30 has a slide belt conveyor 46 mounted on a scale or weighing means that operates through a pivot bar signalling means 47 that registers with photoelectric sensors 54a and 54b in the particular embodiment here illustrated to sense undersize, on size, and oversize. In this particular preferred embodiment, size is detected as weight but it is to be understood that in other embodiments in the classifier could be different and classify according to quality or some other classification. The photoelectric sensor 50, of course, has a light source 51 and an optical system 52 which transfers the beam 53. The formation sensed by the electronic sensor, or eye 50, is received in control box 55 which switches or holds the pivotal gravity feed diverter chute means 32 to properly classify or index the product. As a matter of visual convenience the control box 55 contains a visual light 56 for indicating whether or not the input timing means 27 is in operation and a visual light 57 to show if the classifying sizer 30 is in operation plus three lights 60 to visually indicate that the classification of the product on the classifying sizer 30 is on weight, underweight, or overweight. Electric cord 61 powers the belt conveyor 46 through electric motor 62. The classifying sizer 30 has a suitable frame 63 which contains the appropriate mounting means for its parts. The control box 55 may be mounted in a control panel with other switches such as a total power on and off switch (not shown) for the entire packaging machine 20. The equipment used in providing the classifying sizer 30 was Model Number 1251 special Selectrol System for poultry with solid state circuitry which was purchased from Exact Weight Scale Co. although the specific setup shown in this application was provided by the applicant.

The sensing and initiating means 31 includes a light source 64 and a photoelectrode sensing means 65 for sensing the interuption of the light beam 66 in response to a product passing through the beam as it exits from the dispensing sizer classifying sizer 30. The sensing and initialing means is also tied electrically by cord 67 into the control box 55 and electrically signals or triggers the means within the control box to cause the positioning of the diverter 32 in proper registry with the indexing receiver 33 as selected by the classifying sizer 30.

Figure 4:
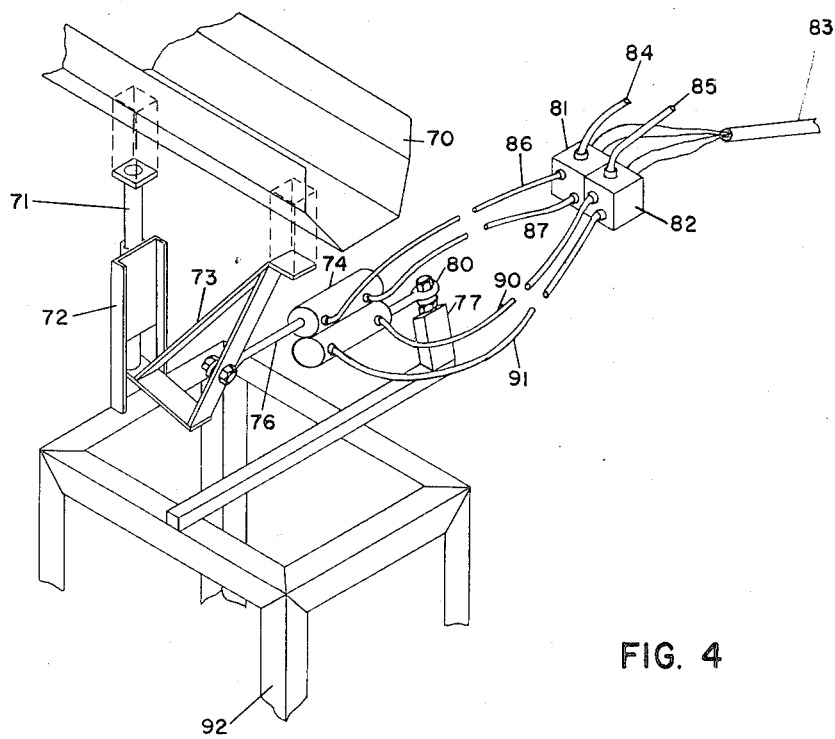
FIG. 4 is a diagrammatic representation in perspective view of the apparatus 32 of FIG. 1 with parts broken away and extended for purposes of illustration.

Looking in a particular now at FIG. 4 it may be seen that the diverter means 32 diverts the classified product to a plurality of inventory storage positions. The diverter means has a chute conveyor 70 which is mounted on rod 71 which is journaled in support 72 for pivoting movement between a plurality of three indexed positions which are selected by response to the weight sensed by the classifying sizer 30 upon the initiation of the sensing and initiating means 31 when it activated by interruption of the light beam 66. A support arm 73 is secured between the conveyor chute 70 and rod 71 as a strengthening member, supporting the conveyor 70 on the rod 71. The conveyor 70 is reciprocated by twin air cylinders 74 and 75 having positive in and out reciprocation air drive. The two air cylinders are bolted together in reverse order as shown in FIG. 4 to provide the desired three positions. Looking at FIG. 4 to reciprocate the conveyor wholly to the right the pistons in both cylinders would be retracted, to reciprocate the conveyor 70 to the intermediate or middle position one of the pistons would be activated to extend the piston rod and to move the conveyor 70 to the left both piston rods would be extended. It may be seen that the air cylinder 74 is tied to support arm 73 through its piston rod 76 and that air cylinder 75 is connected to a retaining support 77 by its rod 80. The air valves are selectively controlled through the control box 55 which signals the desired positions of the conveyor 70 as indicated by the classifying sizer 30 upon an initiating signal from the initiating means 31. The control box electrically triggers the proper sequence in electric solenoid air valves 81 and 82 which are shown connected to the control box 55 through electric conduit 83 FIG. 1. The electric solenoid air values are shown independently connected to an air supply source not shown through conduits 84 and 85, but in actual practice may be cross connected internally so that only one input air conduit and only one input electrical conduit need be brought to the solenoids. This is considered preferable in connecting up the apparatus onsite. However, for illustrative purposes they have been shown separately connected to the signal means at the control box 55 and to the air source. Of course, air conduits 86 and 87 supply the air to drive the piston rod 76 in and out respectively in the conventional manner and air lines 90 and 91 supply the air to drive the piston rod 80 in and out respectively. Frame 92 is provided for supporting the parts of the apparatus 32.

Figure 5:
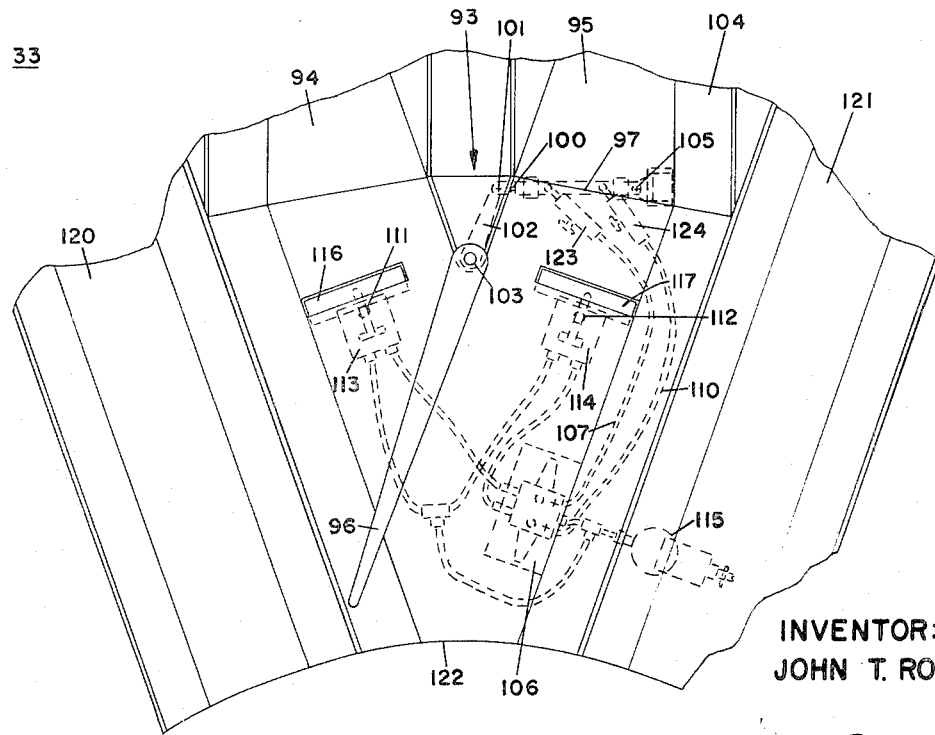
FIG. 5 is a diagrammatic representation in plan view with parts broken away and shown in phantom of the forward portion 33 of the apparatus of FIG. 1.

Looking now in particular at FIG. 5 it may be seen that the indexing receiver means 33, at the outlet from the diverter means, has an alternating switching or diverter gate means 93 that alternates to close one of the two medial or intermediate indexing conveying channels 94 and 95 looking at FIGS. 1 and 5. In FIG. 5 the gate or reciprocal diverter means 96 is shown in solid line in the position indicated by phantom lines in FIG. 1. The diverter means 96 reciprocates alternately to open alternately one and then the other of the intermediate positions which positions will be discussed below. An air cylinder 97 is the power means for reciprocating the gate 96. The air cylinder's piston rod 100 is connected by a pivot joint 101 to an arm 102 which is directly and rigidly connected to the gate member 96 by pin 103. The cylinder 97 is connected to the frame 104 by a pivot joint 105. The air cylinder 97 is of the type that is positively driven to both the rod in and rod out positions by air pressure. An air pilot valve 106 switches the air pressure from the rod in air line 107 to rod out air line 110 in response to the engagement of the triggering plungers 111 and 112 on normally off air switches 113 and 114 respectively which are connected to an air supply regulator 115 and to the air pilot valve 106 as shown in phantom lines in FIG. 5. Triggering signal flap means 116 and 117 operate trigger plungers 111 and 112 respectively in response to a product passing through the open intermediate slot chute and over the flaps which may be seen in FIGS. 1 and 5 to project up in the respective channels 94 and 95 and which are resiliently biased and held upwardly in normal position but flex downwardly to activate the normally off air switches to provide a signal to the pilot valve 106 when a product passes over them. The gate 96 reverses upon each passage of the product into one of the medial channels 94 and 95 when the product engages a respective signaling means 116 or 117. Needle valves 123 and 124 provide a final air pressure adjustment means for air lines 107 and 110 respectively to provide a desired quickness of action in the gate 96.

The outer indexing conveying channel means or slot chute position 120 and 121 are also provided in the indexing receiving means 33. By providing two independent channels 120 and 121 for oversized and undersized product respectively and an intermediate single entrance divided channel 122 which divides into channels 94 and 95, a receiving and dispensing classifying system having four indexing means positions of simplified control requirements is provided. This is particularly true from an electronic standpoint. This is done by requiring the placement of the product in only three categories undersized, on-size, and oversize, on the first sorting with the majority of the product going to the on-size position and dispensing in only three positions via the more expensive electronic controlled apparatus and using a simplified two position reversing gate to separate the on-weight product into two groups. It is possible for the motivating means for switching the divider means 32 to its indexed position to be simplified only two reverse bolted together air cylinders 74 and 75, for example, because of the holding of the initial classification step to three positions. The alternating gate means 32 in the indexing receiver means 33 enables the larger quantity of product in the on-weight size to be distributed into two channels which maintains the overall classifier apparatus in shortened compact construction. Thus, one of the outer slot chutes is for oversize product and the opposite outer slot chute is for the undersized product while the two intermediate slot chutes are for the on-weight material. While this is the preferred embodiment, additional slot chutes or channels could be provided with additional diverters and classifiers having more classification positions. However, it may be seen that such devices quickly become more cumbersome as additional classifications are added and in many instances other systems would then become more advisable than the system of my invention.

As may be seen in FIG. 1 the medial indexing conveying channels 94 and 95 and the outer indexing conveying channels 120 and 121 are a direct and integral part of the plurality of four gravity feed product inventory chute dispensers 125 and 126, 127, and 128 that form a gravity feed dispenser. Inventory storage dispensers 125 and 128 form outer storage positions and inventory storage dispensers 126 and 127 form an intermediate double position. The four chutes are aligned side-by-side and provide four feed and storage channels. The inventory dispensers 125, 126, 127 and 128 have gate means or dispensing means 130, 131, 132, 133 respectively associated therewith. Each of the gate means has three closing rods 134, 135 and 136 which are specifically numbered only at dispensing means 130 because they are identical in the case of the dispensing means 130, 131, 132, and 133. These three closing rods may be seen to project upwardly through apertures or openings in the bottom of the channels at their lower or exit ends, such as 137.

The gate rods reciprocate, rising up and dropping down through the openings to open and close the respective channels or chutes.

Figure 6:
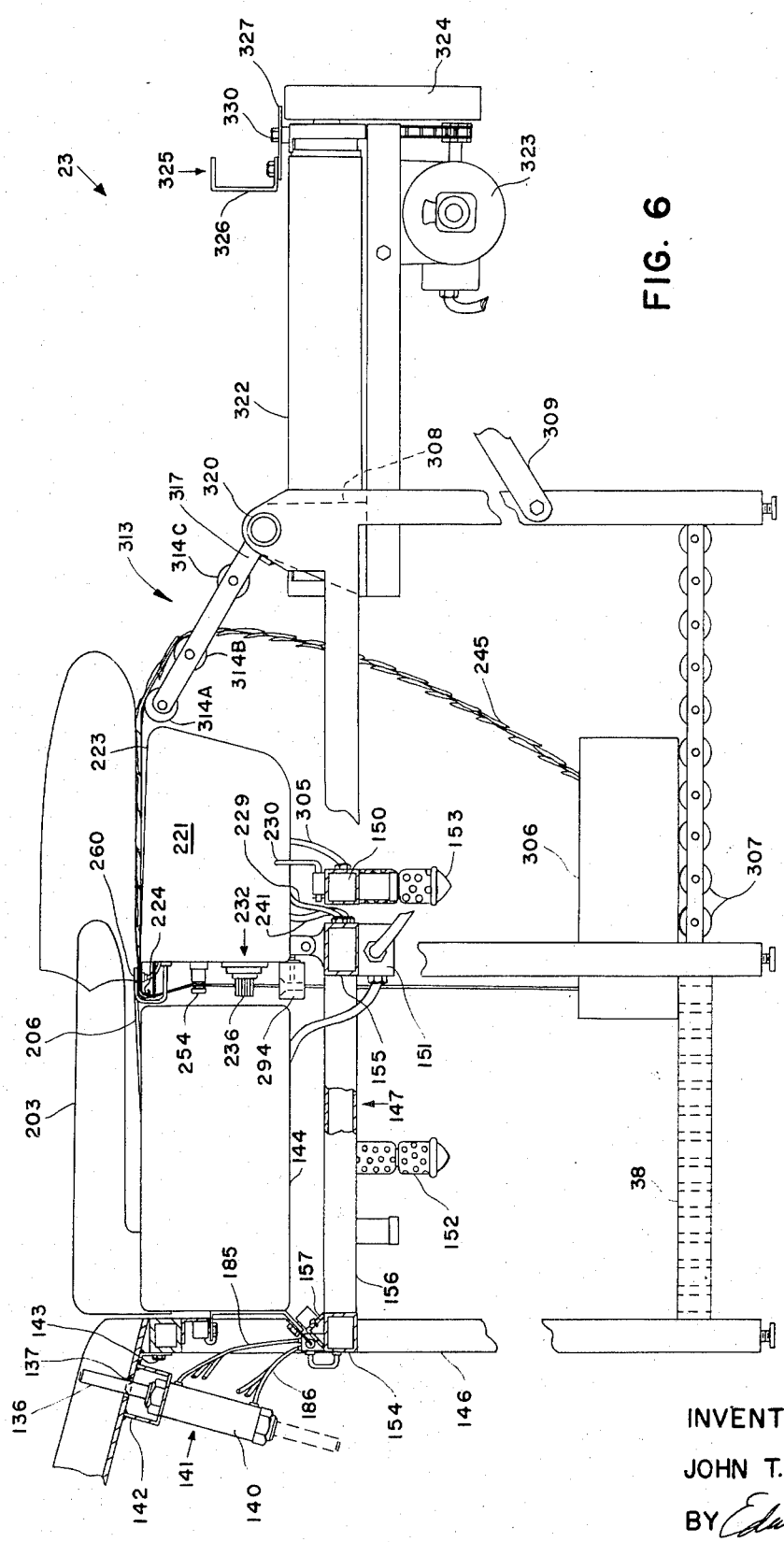
FIG. 6 is a diagrammatic representation in side elevation view with parts broken away of a portion of the apparatus of FIG. 1.

The rods, as may be seen in FIG. 6 referring for convenience to rod 136 for discussion purposes, pass wholly through the piston cylinder 140 to provide a better leveraged mounting for the rod in its closing position when it is bumped against by a large product with substantial force. The entire air cylinder 141 is secured by a bracket 142 to the bottom of the gravity feed inventory chute means 34. The top of the rod 136 is normally rounded so that it will push any product positioned over the gate means out of the way when it closes should an item of product be over the aperture 137.

As may be seen looking at FIG. 6 the product dispenser means 34 is directly connected to the bag loader 22 at 143. The twin reciprocal dispensing air insertion tables, or airblowing means 144 and 145, control the position of the gate means 130, 131, 132, and 133. It will be understood from looking at FIGS. 1, 6, and 7 that air box 144 controls gate dispensing means 130 and 131 and table 145 controls gates 132 and 133. The gate control switching mechanism, or signaling means, of air boxes 144 and 145 are identical and for purposes of convenience description will be given with respect only to air box 144. Only one of the two gate controls of air box 144 will be described, for each of the two gate controls is the same, except obviously the switching mechanism is turned in the opposite direction for operation by the opposite side of the box.

Figure 7:
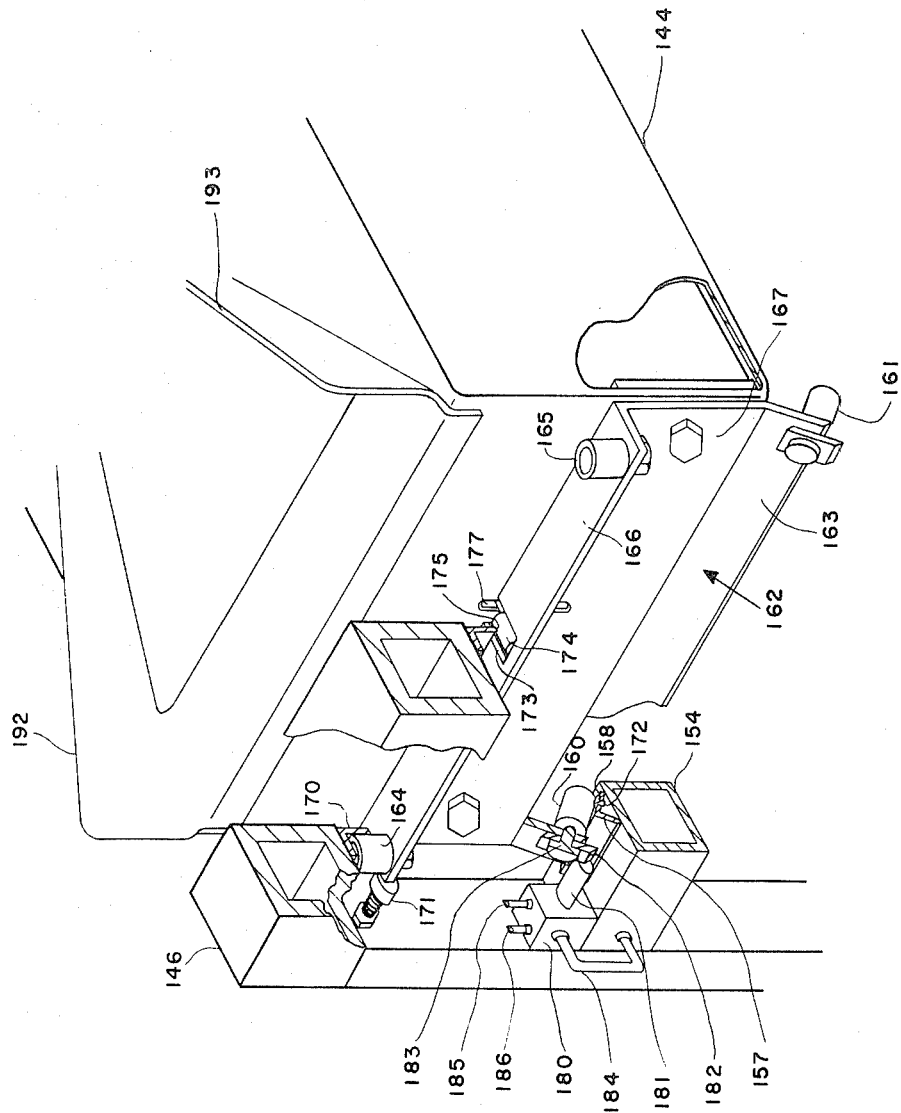
FIG. 7 is a diagrammatic representation in fragmentary perspective view with parts broken away of the apparatus 144 of FIG. 1.

Turning first briefly to the framing mounting the air boxes 144 and 145, frame 146 contains two interconnected hollow manifold members 147 and 150 and an electric conduit member 151. Both the manifold members 147 and the electric conduit also serve as support members. Conduit 147 is a relatively high pressure conduit carrying a pressure of 45 pounds per square inch and manifold 150 is a low pressure manifold carrying a pressure of 27 pounds per square inch in this preferred embodiment. Manifolds 147 and 150 are connected to the same air source through independent air lines (not shown) and they contain pressure regulating means as indicated at 152 and 153 respectively. Manifold 147 has two arms 154 and 155 extending across stream of the package machine and a connecting arm 156 extending in the machine direction and interconnecting the two arms 154 and 155. Arm 154 of the manifold 147 serves as the structural mounting means for the bottom edge of the table 144 which rides on the angle iron 157 which is welded to the top surface of the arm 154. As may be seen in FIG. 7 rollers 160 and 161 are secured to a carriage member 162 which supports air box 144. The bottom edge 163 mounts the wheels 160 and 161, which are mounted projecting perpendicularly therefrom. The bottom edge 163 is set at an angle so that the wheels 160 and 161 engages evenly on surface 158 of the angle iron 157 as shown in FIG. 7. Two upper rollers 164 and 165 are mounted in an outwardly projectly upper edge 166 of the carriage member 162 which extends perpendicularly from the main body 167 of the carriage 162. Rollers 164 and 165 ride against the inside of the track means or angle iron 170. The movement of the table 144 is stopped in its outer direction in alignment with gate 130 by bumper 171 and the table is held in this position by a detent rivet 172. A bearing roller engages the lower edge 175 of the track 170 to maintain the rollers 160 and 161 engaged against the track means or angle iron 157 and in the angled channel or track 176 formed by the angle iron and the flat upper surface of the conduit 155. A slot 173 is formed in the upper edge 166 of the carriage 162 and serves to allow wheel 174 to contact edge 175.

The wheel 174 is mounted by clamping it securely in its adjustment slot 177 which allows vertical adjustment in the position of the wheel. To remove the air box 144 from the tracks of the frame 146 the projection members 182 are pivoted to a horizontal position and the outer end of the air box 144 is tipped upwards and then after the wheel 160 and 161 have cleared track 158, the inner end of the box is dropped to clear wheels 164 and 165 from engagement with track 170 and the box 144 is then free from its mounting. The air box 144 may need to be removed for repairs or other reasons.

To operate the gate 130 an air valve 180 is positioned at the end of the track of the table 144 and has a switch plunger 181 extending beyond the bumper 171 for engagement by a switch engaging projection member 182 secured to the lower edge 163 of the carriage 167 by the same shaft 182 that secures the wheel 160. The switch engaging projection 183 may be rotated upon the shaft 183 to give the proper switch engagement so that the switch will not be broken by being overpressed. The switch engaging projection member 183, however, is tightly held so that it will not move unintentionally. It may be seen that the air valve 180 is connected to the manifold 155 by conduit 184, air lines 185 and 186 extend from the air valve and branch to connect to the respective cylinders controlling rods 134, 135, and 137. It will be understood that the opposite end of the track for table 144 is an exact reverse of the end illustrated in FIG. 7 and functions in exactly the same manner to operate the gate 131. It will also be understood that the air box 145 has the same mounting, movement characteristics and action as the air box 144.

Figure 8:
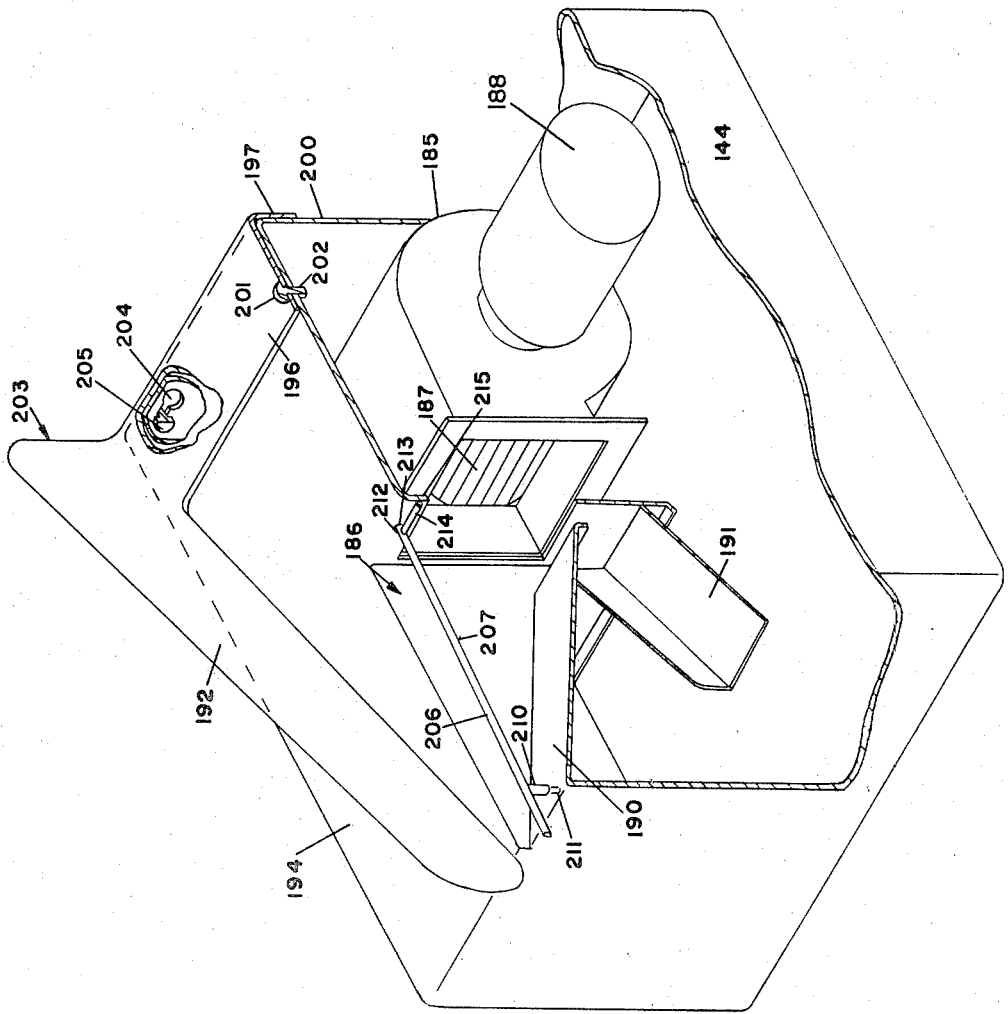
FIG. 8 is a diagrammatic representation in perspective view with parts broken away of a different view of the apparatus of FIG. 7.

Looking now at other aspects of the air box insertion table 144 and in particular at FIG. 8, it may be seen that the air box contains an air blower 185 of the centerfugal drum type driven by an electric motor 188 mounted in the air box as may be seen. An air chute 186 is provided to direct the air from the outlet 187 of the air blower 185 upwardly and provide the proper functional air flow. The chute extends to the outer edge of the upper table surface 194. The lower chute defining surface or air deflection plate 190 stops short of the lower edge of the outlet 187 of the air blower 185 to leave a gap therebetween and the bottom of the table 144 is open so that in normal packing house procedures, water and other material falling off of the product into the chute may pass down the chute and fall through the open bottom of the table 144 without fouling the air blower 185. To this end a reverse chute deflection plate 191 is secured to the margins of the outlet 187 of the blower below air deflection plate 190 and extends from adjacent the blower at an angle to slope downwardly in a reverse direction away from the blower to better dispose of the possible waste material 41 falling through the gap between the air deflection plate 190 and the blower 185 in a more desirable fall through direction and speed.

Product guide and insertion arms 192 and 193 (FIG. 7) are shown extending over and above the upper planar product transfer table surface 194 and forming therewith a loading chute. The arms are resilient and spring apart when a product larger than their outer separation distance is forced through them. They are made of spring steel and they are connected together by a crosspiece 196 engaged on the upstream end 200 of the air box. The arms 192, as may be seen in FIG. 1, are widely spaced where joined by member 196 at their upstream ends and converge at their downstream ends. The crosspiece 196 contains a rivet 201 which engages in aperture 202. Thus the upper surface 194 contains one of the elements or members that secures the product guide and insertion device 203 in position. A depending flange 197 depends from the planar mounting member, member 196 at its upstream end by and fits over the edge of the table surface 194 opposite said chute edge and aids in securing the product guide in the air dispensing table. Key slot 204 and key 205 (another set being on the cut away portion exactly opposite the ones shown) engage in the back 200 and slide into position to further secure the product guide and insertion device in position. Of course, to mount the product guide and insertion device it is first tipped upwardly and the key is fitted into the key slot and the guide is then slipped into its locking position as indicated in the drawing and then the rivet is fitted into its aperture 202 to prevent the guide from becoming dislodged accidentally. A small product guide and sliding surface protective rod member 206 is provided to fit over the chute so that a product will not excessively protrude or hang down into the chute 186. Except for the guide 206 a small product could even fall into the chute. As may be determined from FIG. 8, only one half of the guide 206 is shown, the other half being exactly identical. The guide 206 has a forwardly projecting rod 207 which has a post 210 which has a reduced diameter 211 received in an aperture in the bottom surface 190 of the chute and a rearwardly extending portion 212 engaged in a mounting aperture 213. The rearward insertion of the guide portion 212 is stopped by the cross bar 214 which engages against the turned down edge 215 of the surface 194. The rod is positioned by first inserting the rearward extending portion 212 in the aperture 213 and thereafter inserting the reduced area 211 in the aperture in the bottom of the chute. Of course, it will be understood that the side of the guide 206 that has been cut away for purposes of illustration has complimentary parts simultaneously position as indicated for the side described. The guide is removed to clean the chute 186.

Figure 9A:
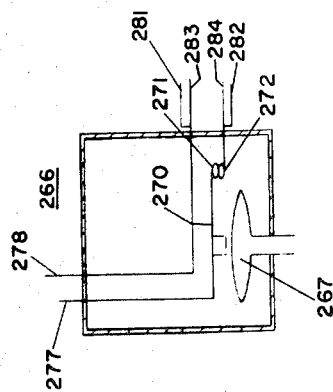
FIG. 9A is a diagrammatic representation in side elevation view of the switch 226 of FIG. 9.
Figure 9:
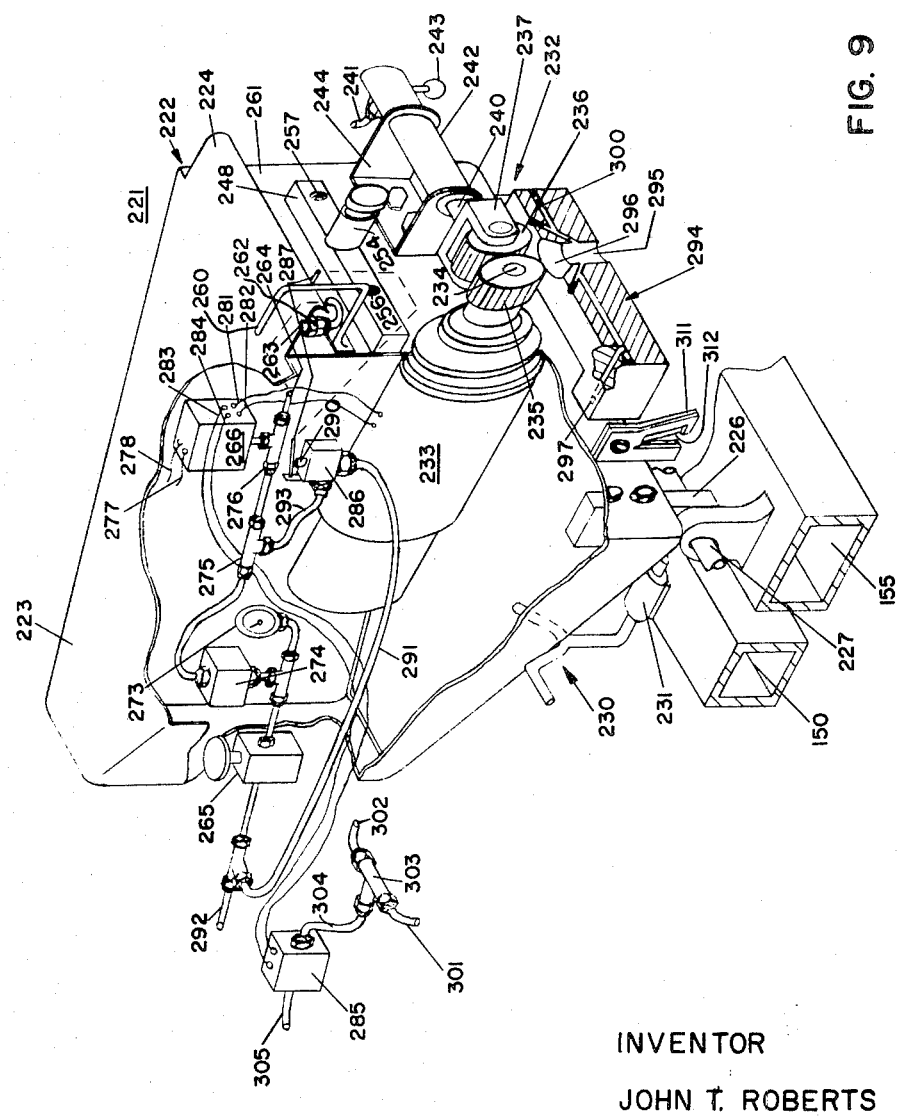
FIG. 9 is a diagrammatic representation in perspective view with parts broken away of the apparatus 221 of FIG. 1.

Looking now at FIGS. 1, 6, and 9, a product insertion table and bag indexing means or tape puller unit means 216, 217, 220, and 221 may be seen. The forward edges of the product insertion tables generally define the loading position. Each of the product insertion tables is in general alignment with one of the dispensing chutes. The table and tape indexing units or bag loaders and product insertion stations are shown only in diagrammatic outline in FIG. 1 in order to better illustrate the overall packaging system. Looking now at the more detailed presentations of the table and tape units and taking by way of example unit 221 and looking in particular at FIGS. 6 and 9, it may be seen that a product insertion table 222 is provided having a product support surface 223 that defines the bag loading position. The forward edge 224 of the product insertion table 222 is curved downwardly as may be seen in both FIG. 6 and 9. The forward edge of the product insertion table is at the forward edge of the loading position. The bottom of the table and indexing tape unit 221 is open so that easy access to the inside of the unit 221 may be had simply by rotating the unit 221 on its pinned mounting 226. Rod 227 serves as the pin and passes through respective aligned bracket members as shown in FIG. 9. To totally dismount the unit it is only necessary to remove the rod 227. The rod 227 passes through a mounting (not shown) that is a reverse of mounting 226 on the other side of unit 221 and is held in position through these two mountings by any convenient means such as pins. As may be seen from FIG. 1 and 6 if the table 145 is moved to align with the unit 220 then unit 221 may be rotated into the now open space vacated by the table 145. The finger operated support yoke 230 is provided on one side of the unit 221 to support it in stationary operating position. Yoke 230 may be rotated in its frictional journaling member 231 (FIG. 9) which is welded to the upper surface of the mandrel 150. Mounting member 226 is attached to the top surface of mandrel 155.

The bag interconnection means puller or tape puller 221 acts as a bag dispenser positioner means, positioning bags sequentially in the product insertion station. The bag positioner may be seen in FIG. 6 and in greater detail in FIG. 9. A power means, electric motor 233 of the slow speed nonreversing type, may be seen in FIG. 9 to be directly connected by power transfer means shaft 234 to a powered tape pulling gear wheel means 235 having gear teeth on its outer circumferential periphery which mesh with the gear teeth of an ideler tape pulling gear wheel means 236. The teeth on the two wheels 235 and 236 engage or mesh with one another to grip the tapes 252 and 253 (FIGS. 10 and 12) therebetween and thereby convey the tapes upon rotation of the powered tape pulling means 235. Wheel 236 is journaled in bracket 237 which is directly connected to piston rod 240 and thereby driven into and held in meshing engagement with wheel 235 by the continuous supplying of air under pressure through air lines 241 to the air cylinder 242. The cylinder 242 is spring loaded to bring about the retraction of the piston rod 241. To release wheel 236 from meshing engagement with wheel 235, handle 243 is moved to a valve closing position to shutoff the air to the cylinder 242. The cylinder is vented through the valve to allow the air to bleed from the cylinder 242. To reengage the wheel 236 with the wheel 235 the handle is moved to the position to open the valve and admit air into the air cylinder 242. The air cylinder 242 is secured in the unit 221 by a bracket means 244.

The particular packaging machine 20 shown as the preferred embodiment of this invention is equipped to handle double taped chains of imbricated bags such as shown in FIGS. 11, 12, and 13. The imbricated package or assembly of bag 245 is made up of a plurality of individual bags 246, 247, 250, and 251. These bags are adhered to two parallel and spaced apart pressure sensitive tacky tapes 252 and 253.

Looking now at FIGS. 6, 9, and 10, a grooved tape guide wheel 254 may be seen to be mounted on a bar or mounting bracket means 248 which has several mounting positions other than the one it is presently in so that it may be moved laterally to accommodate different spacings of the two tapes. Bags which are narrower generally have more closely spaced tapes and bags which are larger generally have tapes spaced further apart. Of course, a corresponding guide wheel 255 is similarly mounted. The pair of guide wheels may be seen to be horizontally spaced apart for respectively guiding the strands of tape from the production insertion table to the meshing driven gear wheel and idler gear wheel. The product guide member 260 which cooperates with product guide 206, is secured to the forward face 261 of the unit 221. Of course, product guide 260 has a twin in the same position but on the cut away portion of the assembly 221 shown in FIG. 9. Product guide 260 is positioned just inside of the adjacent product guide rod 206 so that a product moving across the rods 206 will be received directly on guides 260 where they are juxtapositioned thereby lifting the product up over the edge of the product support surface 223 in its medial position so that the product will not catch on the forward edge of the bag in the loading position removing it from the tape prematurely or jam the signaling means 263 or 287.

The electric motor 233 operates sequentially to move respective ones of the imbricated bags into the loading position successively as the previous bag is removed from the loading position. A sensing or signalling means, air jet 262 responds to the removal of a bag covering the opening 263 of the air jet. This freeing of the opening to the airjet allows the air to readily escape from the opening 263 which results in a drop in the air pressure in line 264. In this preferred embodiment the air is continuously supplied to line 264 at 3 pounds per square inch through pressure regulator 265. This allows the bellows 267 to contract and the normally closed switch 266 which is shown in diagrammatic section in FIG. 9a closes energizing the motor 233 and driving the powered tape pulling wheel 235 indexing a new bag in the loading position, in which position the forward edge of the bag covers airjet 262. This causes an increase in the air pressure in line 264 expanding diaphragm 267 and thereby moving switch blade 270 and opening contact 271 from contact 272. Of course, the removal of the bag would cause the diaphragm to return to its normal contracted position allowing the contact to close again and reenergize the motor 233 to index a new bag. Air line 264 contains a pressure gauge 273, a flow control valve 274 to trim the air pressure and remove any substantial fluctuations or backup pressure therefrom, a connection T 275, and a T 276 on which the switch 266 is mounted. Switch 266 is electrically connected to incoming wires 277 and 278 from a power source and by wires 281 and 282 through the electric motor and through wires 283 and 284 to solenoid air valve 285. Thus, the air jet signalling means is generally responsive to the presence or absence of a bag at the forward edge of the loading position and the indexing means responds to the signalling means to sequentially activate the driven gear wheel to singly replace bags as they are singly removed from the forward edge of the loading position.

A mechanical override valve switch 286 has an operating switch arm 287 that extends through the forward face 261 of the unit 221 below and beyond the forward edge 224 of the surface 222 so that should a bag being indexed in the loading position not operate the signalling means 262 as it is pulled down over the edge 224 it will engage against the operating arm 287. The operating arm 287 then engages plunger 290 opening valve 286. Valve 286 is directly connected by air line 291 to the air input line 292 which is connected to the manifold 150 which is under an air pressure of about 30 p.s.i. The opening of valve 286 therefore supplies air at 30 p.s.i. through line 293 to line 293 to regulator 265. The relatively high and excessive pressure air passes through line 264 to T 276 and brings about the expansion of diaphragm 267 whether or not the outlet 263 is open, opening the electrical circuit to motor 233 causing the motor 233 to shutoff and allowing the bag that has been indexed into the loading position and overindexed to some extent to either function in the normal manner or if the bag is incapable of this for some reason, such as being split, the bag can be removed.

The tapes 252 and 253 are threaded over respective idler rollers 254 and 255 and between the gear conveying wheels 235 and 236 and below the wheels through aspirator 294 for air conveyance away from the conveying wheels 235 and 236. The tapes are stuck together when they are passed in between the wheels 235 and 236 and threaded through the opening 295. The tapes are drawn down into the aperture by the moving air injected in a downward direction and propelled from the lower end of the aperture. The upper end of the aspirator throat 295 has an enlarged entrance 296 to aid in threading the tapes into the throat and also in their continuous conveyance through the throat 295. The aspirator has two inlets or air injection passages, 297 and 300 that enter the throat 295 from opposite sides at a downstream angle below said enlarged entrance 296. The inlets 297 and 300 are connected through lines 301 and 302 to a connecting T 303 which is connected by line 304 to a valving solenoid 285 which is connected by line 305 to the high pressure mandrel 155 which has its air pressure maintained at 45 p.s.i. The spent tapes 252 and 253 are normally stuck adhesive face to adhesive face as they pass through the wheels 235 and 236. The spent tapes then are drawn through the aspirator 294 away from the gear wheels 235 and 236 and flow back into the box 306 (FIG. 6) for disposal.

The box 306 is positioned on rollers 307 which are secured to the frame 146 which mounts both the unit 144 and the unit 221. The rollers 307 form a platform under unit 221 and extend back under conveyor 322. A tape cutter knife 311 is provided adjacent to the aspirator and mounted on the front face 261 of the unit 221 so that when the box 306 is to be replaced by a new box, the tape may be severed by raising it from below the aspirator and severing it, allowing the box to be removed with the spent tape therein. The tape cutting knife member 311 has a knife blade 312 therein. The tapes 252 and 253 extend beyond the region of attachment of the last bag in the particular chain of imbricated bags and can be hooked to the lead tapes in a subsequent box of imbricated bags to form a continuous chain therewith as further described in copending patent application Ser. No. 666,855, inventor Ralph L. Wing, entitled "Package of Bags" which is assigned to the same assignee as this application.

Looking now in particularly at FIG. 6, the tape bags 245 are fed from supply box 306 which is below the unit 221 up between the front frame members of frame 146 and depending on the length of the bag over one of the respective rollers 314a, 314b, and 314c of unit 313 up onto the surface 223 of the unit 221. Of course, a supply box 306 is provided for each product insertion table 216, 217, 220 and 221. The tape bag feeder may be seen to include the horizontal rollers 314a and 314b which are in general alignment with the upper surfaces of the product insertion tables. The tape bag feeder also includes the second set of rollers 307 which is below horizontal rollers 314a and 314b and aids in receiving and positioning the packages of imbricated bags for dispensing over rollers 314a and 314b. Roller 314c is a gravity conveying product conveying roller and it is aligned with and joined in an assembly with rollers 314a and 314b. Roller 314c serves to dispense a bagged product from the product insertion table. Of course, the bagged product also passes over and slips over the bag covered rollers 314a and 314b.

As may be seen in FIGS. 1 and 6, the rollers 314a, 314b, and 314c are mounted on a frame 317 which rotates at its journaled mounting 320 in the frame 146. The unit 313 may be rotated on journaled mounting 320 toward the packaged product conveyor 322 so that it will lay thereon for access into the space therebelow or when conveyor 322 is moved as shall be explained next.

The bagged product belt conveyor 322 has a frame 319 secured at journaled mounting 320 to the frame 146 and held in position by support member 309. It will, of course, be understood that journaled mounting 320, and support members 309 have exact counter parts in reverse at the other side of the frame 146. Bracket 308 connects the conveyor 322 to journal mounting 320. Support member 309 has a pivotal mounting 315 and is bolted to the conveyor 322 by bolt 316. Upon removing the bolts 316 the conveyor 322 will swing down under the upper frame members to make the frame 146 and its connected parts narrower for easy entrance through plant doors and through other narrow passageways. Of course, the conveyor 322 is of such a width that it will pass above the rollers 307 and may be swung under the frame 146 until the support member 309 may be rebolted through the use of bolts 316 to secure the conveyor 322 against movement during shipment. The conveyor 322 is powered by an electric motor 323.

The loaded bag would pass from the product insertion table's support surface 223, for example, across the unit 313 and directly down onto the conveying belt surface of the conveyor 322 which is below the unit 313. The bagged product belt conveyor is shown conveying in a direction perpendicular to the direction of alignment of the product insertion tables 216, 217, 220 and 221 in this preferred embodiment. Of course, the conveyor could be directed in other directions in specific plant situations. To prevent the loaded bag from going off the side of the conveyor 322 when it is oriented perpendicularly to the direction of loading, as is shown in FIG. 1, an adjustable back stop 325 is provided. The back stop member 326 is secured to the slotted bracket member 327 which is bolted to the frame by bolt 330 so that the back stop may be adjusted by swinging it in or out the length of the slot or canting it in either direction and then secured in position by tightening the bolt 330. It will, of course, be understood that a similar bracket is provided at the other end of the back stop member 326.

Looking now at FIGS. 1 and 2, the bag product conveyor 23 may include several belt conveyors or a plurality of other conveyor means and may include portions of conveyor means that also perform other functions. As shown the bagged product conveyor includes not only belt conveyor 322 but an additional belt conveyor 331 and a portion of belt conveyor 332. Of course, the belt conveyor 331 would have conventional support frame members (not shown) as would also belt conveyor 332, the frame members being omitted for the purpose of clarity of illustration of the invention. A bagged product such as a poultry product 333 would pass along conveyor means 23 and an operator standing at the position marked as 334 lifts the bagged product from the conveyor and positions it on a vacuum nozzle 335. The apparatus shown displays only four nozzles, 335, 336, 337 and 340 for purposes of illustration. Whereas in actual fact, six are present on the specific machine in operation. The number can be more or less depending on the particular time sequence and number of operators who will operate the equipment and like considerations. For clarity of illustration, only four are shown. Of course, the parts and operation are the same regardless of the number of nozzles employed.

Figure 14:
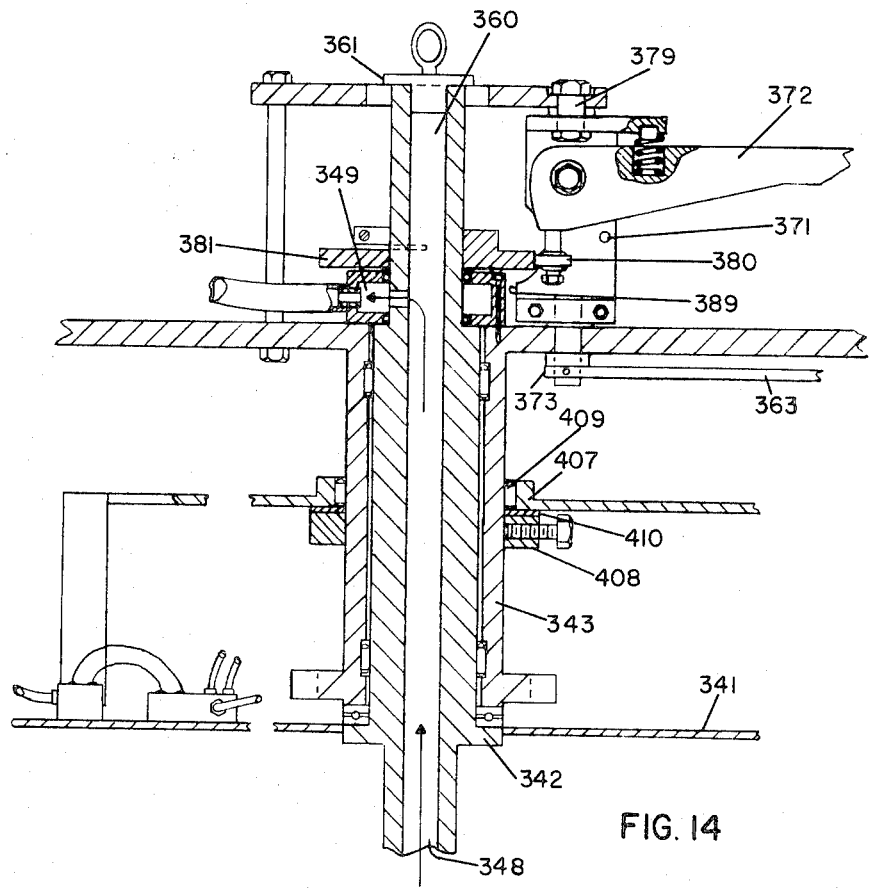
FIG. 14 is a diagrammatic representation in fragmentary side elevation view with parts broken away of the apparatus of FIG. 2.

Looking now at the vacuumizing and closing device 24, the device 24 has a stand 341 which is shown in partial view in FIG. 2 which supports the device. A rigid hollow tubular member 342 is securely fastened to the stand 341 and an enlarged rotating member 343 is journaled thereon for rotation by the chain drive means 344 which is engaged on sprocket 345. The chain belt is driven at a constant speed by the driving means 346 which is powered by an electric motor 347 through gear box 350 and sprocket 351 which are mounted on the stand 341. The inside of member 342 is hollow and has a vacuum supplied from a source (not shown) through vacuum hose 352 to an evacuation chamber 353 which is connected via ports (not shown) in the tubular member 342 to the vacuum passage or channel 348 (FIG. 14). The vacuum channel 348 is connected to plenum chamber 349 which connects with hoses 354, 355, 356 and 357 which respectively supply the vacuum to the respective nozzles 335, 336 and 337 and 340. The inside of the passage 348 may be cleaned out through opening 360 which is opened through trap 361.

Figure 14B:
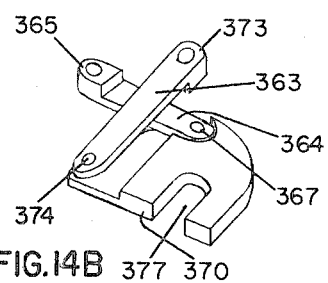
FIG. 14b is a diagrammatic representation in perspective view of the clamping means 362 of FIG. 2.

Each nozzle 335, 336, 337 and 340 has a respective one of the mechanical nozzle clamps 362 shown in phantom lines in FIG. 2, only one of the mechanical nozzle clamps being shown. As may be seen, the clamp 362 contains 2 linkage arms 363 and 364. Arm 364 has one end 365 pivotally secured to the bottom surface of the clamping plate 366 (FIG. 2 and 14b) and the other end 367 pivotally secured to the pivotal clamp head 370. Clamp arm 363 has one end 373 secured to the base 371 of the mounting arm 372. The other end of 374 of the arm 363 is pivotally secured to the side of the pivotal clamping head 370. The arm 363 is rigidly mounted to the bracket 371 so that as the nozzle 335 is moved into the slot 375 (FIG. 2), of the clamping table 366 it will pull the forward edge of the pivotal clamping head 370 forward causing it to rotate on the arm 364 on which it is positioned. As the arm 363 continues to pull the slotted edge of the clamping member 370 forward, it causes it to rotate on the arm 364 until it closes against the outside clamping surface 376 (FIG. 16) of nozzle 335. The opening 377 of the clamping head 370 is slightly larger than the circumference of the outer surface 376 to assure the easy entrance of the nozzle surface 376 into the clamping head 370. The clamp parts are maintained closed in their clamping position by the slight overcenter positioning of the arm 364 so that it in effect has a snap fit.

Figure 14A:
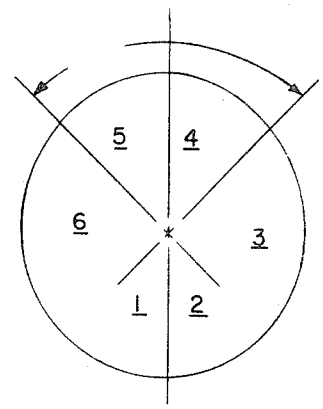
FIG. 14a is a diagrammatic representation in plain view of the cam 381 of FIG. 14.
Figure 16:
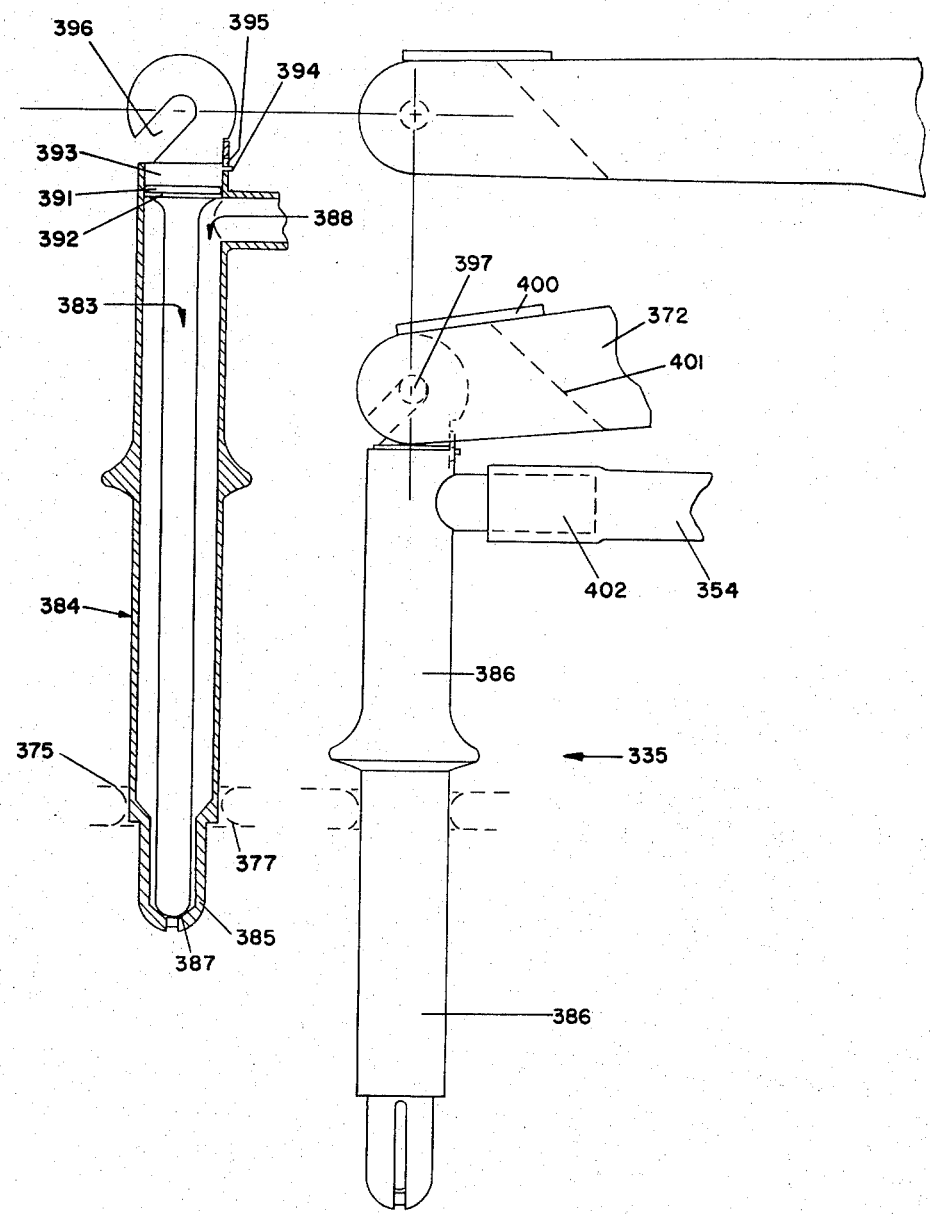
FIG. 16 is a diagrammatic representation in side elevation view of the nozzle 335 of FIG. 2 in both its down clamped position and its raised clamped position.
Figure 18:
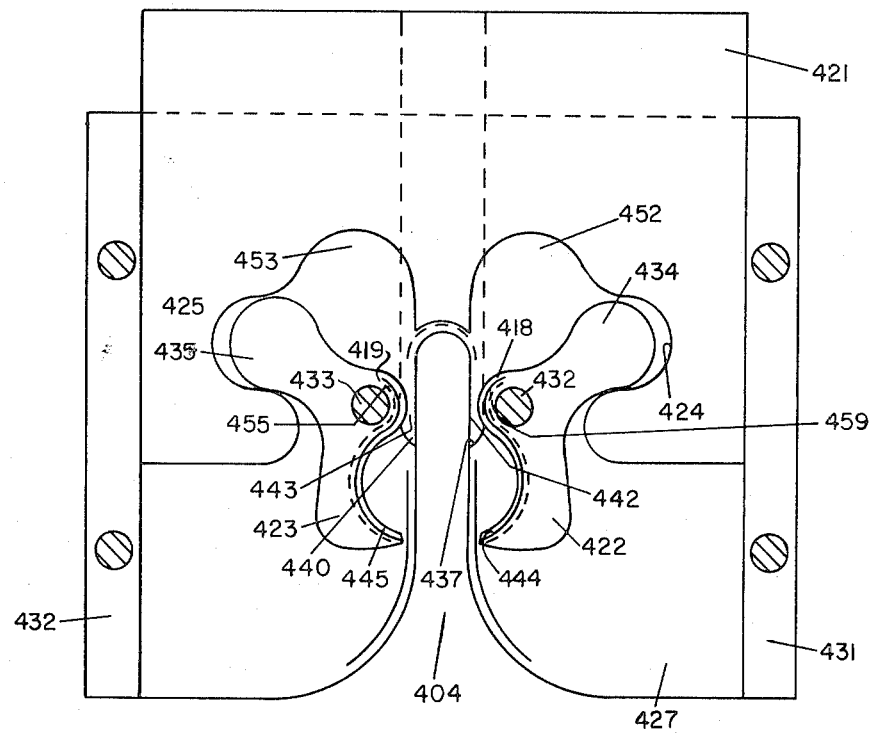
FIG. 18 is a diagrammatic representation in plan view with parts broken away of a portion of the clipper of FIG. 17.

As shown in FIG. 2 and illustrated in FIG. 16 with the bag removed for clarity of illustration, the nozzle is clamped in its lower or down position and secured in this position by the clamping head 370 against the outside clamping region surface 376. The bag is normally in position and clamped between head 370 and surface 376. The bag is usually made of somewhat resilient material so that it has some give to it. It is generally necessary that the bag more than fill the free region between the inside 377 of the closed clamp head 370 and the surface 376 and yet not be in such excess quantity that the clamping means will actually penetrate through the bag. The clamp holds the loaded bag in position and maintains the nozzle in the down position until it is moved by the lifting of the arm 372 by the outwardly movement of the follower wheel 380 which is connected directly and positively to arm 372. Arm 372 is pivoted at 382 in bracket 371 (FIG. 14). The cam 381 is shown in schematic layout in FIG. 14a and it will be understood that the clipper's position corresponds to cam section 5. The nozzle begins its upward movement in section 4 of the cam and is up in section 5. The nozzle lowers again in section 6 of the cam. The high area of the cam pushes the wheel 380 outwardly and this obviously directly lifts the outer end of the arm 372 and the nozzle carried thereon.

Figure 15:
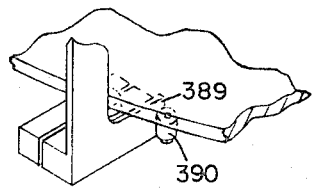
FIG. 15 is a diagrammatic representation in fragmentary perspective view with parts broken away of the opening camming parts of arm 372 of FIG. 2.

The nozzle is of a very simple and advantageous construction. In FIG. 16, it may be seen that the nozzle has a central pin member of rod valve 383 which is secured in a tubular housing member 384 which has restricted nozzle tip 385 and a hand grip region 386 formed on its outer surface. The valving end 387 is pulled open initially by an operator who places the neck of a bag around the nozzle and extending well upon the hand grip and by gripping hand grip over the bag pulls down opening the nozzle by pulling housing 384 away from tip 387 opening the vacuum passage 388 therethrough. The table 366 rotates continuously and the operator pushes the arm 372 into slot 375 while holding the handle down. The clamping means 362 closes overcenter and is thereby locked in position until unlocked by the engagement of projection 389 with a cam wheel 387 as shown in sectional view in FIG. 15. Cam 387 would be in quadrant 5 of cam 381 and projects from the lower surface thereof and acts substantially simultaneously with the clipping of the bags neck. As the projection passes over wheel 390, the arm 372 would pivot on bearing 379, (FIG. 14), moving arm 363 which is rigidly attached thereto unlocking clamping means 362 and swinging it and arm 372 back to the position shown in FIG. 2. As soon as surface 376 is released the vacuum lifts the housing 384 on the valve rod 383 shutting off the vacuum nozzle 335. As may be seen the only vacuum seal required between the parts of the nozzle that move is an O-ring 391 on O-ring seat 392 at the head 393 of the valve rod 383. The housing's movement is limited by pin 394 in slot 395 as may be seen in FIG. 16. The vacuum nozzle is mounted by hooking slot mounting means 396 over shaft or pin rod 397 which is mounted in the arm 372. As may be seen in FIG. 16, there is sufficient space between shaft 397 and plate 400 and plate 401 to enable the nozzles removal simply by rotating the nozzle clockwise and slipping the slot 396 off of shaft 397. When the nozzle is positioned on shaft 397 and depends downwardly the plate 400 prevents it dislodgement from the shaft 397. The inlet 402 in the sleeve housing 384 is connected to the vacuum hose 354 for supplying the vacuum to the nozzle.

Figure 17:
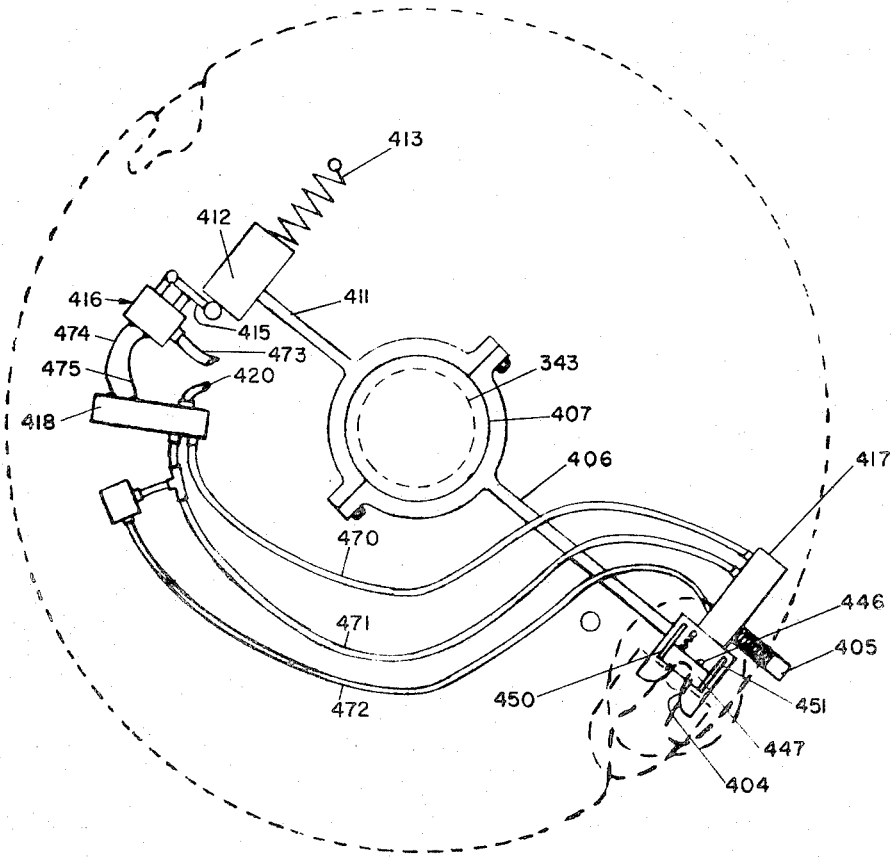
FIG. 17 is a diagrammatic representation plan view with parts broken away of the apparatus shown in FIG. 2 and 14.
Figure 20:
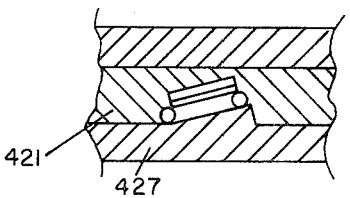
FIG. 20 is a diagrammatic representation in cross section of a portion of the clipper feed track of FIG. 19.

As the plate member 366 rotates it brings the clamped and raised nozzle to the clipper 403 FIGS. 2, 17, 18 and 19. The nozzle was raised by the action of cam 381 as the table or plate 366 rotated. The neck of the bag is not drawn upwardly with the nozzle, the nozzle slides in the bag's neck which bag neck is held stationary by the other elements in the total clamping means. The bag's neck is thus empty where it extends just below plate 366 and it will be carried by the tables rotation into the restricted throat 404 of clipper 403 as shown in FIGS. 2 and 17. The clipper may be seen in enlarged view in operating sequence in FIGS. 18 and 19. FIG. 20 is a cross-sectional view of the clip feed track. Clips are fed through feed track 405.

As the bag's neck engages the back of the throat 404 of clipper 403 the clipper is pushed backward thereby. The clipper may be seen in FIG. 17 to pivot about rotating member 343 being mounted on an extension or arm 406 of collar 407, which collar rests on a support ring 408 (FIG. 14) secured to member 343 and rotating therewith. Collar 407 moves independently of member 343 on a bearing surface 409 and thrust bearing surface 410. It is obvious that the clipper support and operation parts shown in FIGS. 14 and 17 have been entirely omitted from FIG. 2 for clarity of illustration. An extension or arm 111 extends from the opposite side of the clipper from arm 406. A counter weight 412 positioned at the outer end of arm 411 both to counter the weight of clipper 403 and provide the proper initial operating feature to the clippers operating means, the counter weight 412 may be seen to depend from the end of arm 411 and to be restrained by a helical spring 413 to secured to stand 341. As the counter weight 412 is rotated against the bias of the spring 413 it engages a switch arm 415 on switch 416. The depression of switch arm 415 activates solenoid valve 418 which is connected by airline 420 to a source of compressed air supplying air to the air cylinder 417 activating the plunger therein to close a clip about the neck of the bag as will be explained hereinafter. The switch handle 415 has sufficient override to allow a sufficient period of time for the clipping operation to be completed and the neck of the bag severed.

Figure 19:
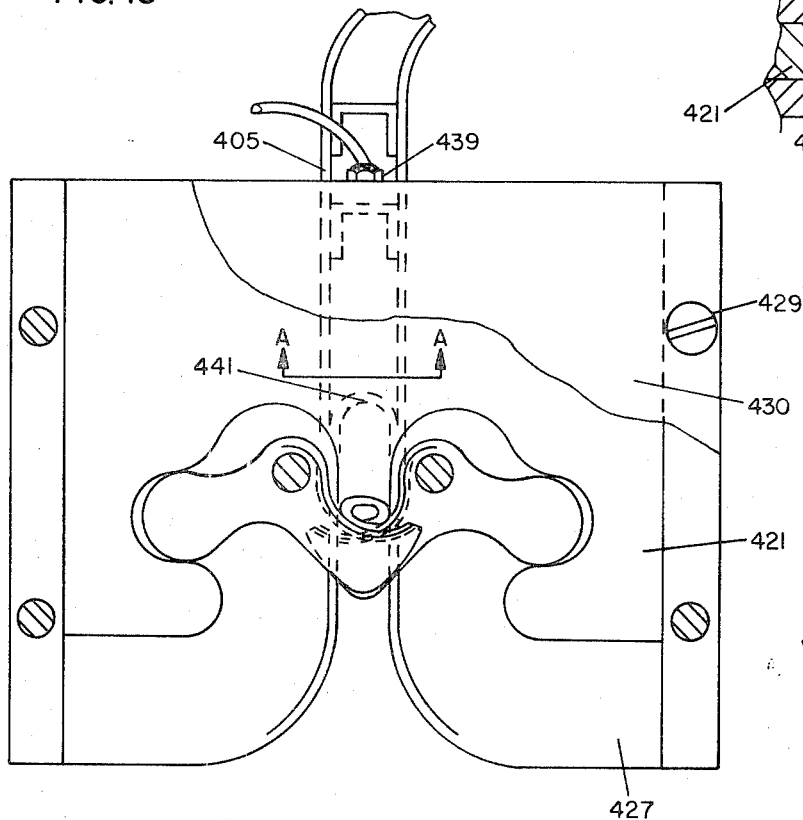
FIG. 19 is another diagrammatic representation in plan view with the parts broken away of the clipper of FIG. 18 showing additional parts and the clipper in closed position.

The clipper 403 has a piston rod (not shown) of air cylinder 417 directly connected to the ram 421 so that the ram is positively driven forward. The ram is mounted between two plates 427 and 430. Spacers 431 and 432 are positioned between plates 427 and 430 at their outer edges and form a channel therewith. Plates 427 and 430 are secured together in any convenient manner such as by screws 429. The ram 421 may be seen to have cut out configurations or rotation sockets 424 and 425 for operating the clip closing fingers 422 and 423 respectively by a camming action in cooperation with the punch 426 when it is moved forward. The fingers 422 and 423 are mounted on pivot pins 432 and 433 respectively which are secured between the plates 427 and 430 by being trapped therebetween as are the fingers themselves. Each of the fingers 422 and 423 has a lobe, 434 and 435 respective, engaged in the respective camming rotation socket 424 and 425 which may be seen to rotate the fingers in and out as the ram plate 421 is moved forward and retracted. A clip 441 is fed into the path of the punch 426 by a sharp pulse of air from a pulse jet 139. The clip is blown down the track 405 which is formed between ram plate 421 and plate 427 and as shown in cross section in FIG. 20. The inside edges 419a and 419b of fingers 422 and 423 are wide adjacent to plate 427 and diminish upwardly so that they form a camming surface at the end of the clip track, causing the clip to move up into the relatively rounded grooves 444 and 445 for operation. Of course, each camming surface 419a and 419b is matched with the slanted entry of the clip and of the offset of the grooves 444 and 445 which are formed in the fingers where they which pass each other in closing the clip. The punch comes in timed sequence with the clips and proceeds to finish feeding the clip until the outer tips 437 and 440 of the clip's legs 442 and 443 engage securely in the closing channels 444 and 445. The tips of the clips legs 442 and 443 both slide along in the channels and at the same time are bent by movement of the channels inwardly toward one another and by the shape of the channels. Thus, the clip is formed to a very advantageous configuration such as is shown in FIG. 19. Clearance wells 452 and 453 allows the ram to move fully forward to close the fingers without engaging the intermediate regions 454 and 455 of the fingers which carry the camming surfaces 418 and 419. There is sufficient override in the engagement of the lobes 434 and 435 in the rotational camming sockets to allow a pin 446, (FIG. 17) which is mounted on ram 421, to engage a knife blade 447 riding in channel member 450 and 451 and push the blade through the constricted neck of a bag severing it and allowing the clipped and bagged product to fall to the conveyor 332 without further distorting the clip 441.

The severing of the bag's neck causes the bag to fall and, of course, then there is no longer anything pushing against the clipper 403 and therefore spring 413 draws counterweight 412 away from switch handle 415 returning the clipper to its original position. The release of switch arm 415 reverses valve 418 supplying air to the other side of the piston in cylinder 417 retracting ram 421 which opens fingers 422 and 423.

Air lines 470 and 471 power the reciprocation of the plunger in cylinder 417 and air line 472 powers the pulsing jet 439 with a proper timing delay to feed clips 441 through the feed track 405. Electric cord 473 supplies power to the switch 416. The switch 416 is connected by wires 474 and 475 to the solenoid 418.

It may be seen that vacuumizing and closing device 24 is at the feed out of the bagged product belt conveyor 322. The device 24 not only vacuumized and closed the bag but conveyed the bag so prepared, or that is, while in preparation to the opposite side of the device from the feed in of belt conveyor 322 and fed or deposited the prepared bag from the device.

The bagged product is carried on conveyor 332. Conveyor 332 is adjacent to and in direct line extending away from device 24. Conveyor 332 delivers the product from the device 24 to another conveyor 456. Conveyor 456 delivers the bagged product through a shrink tunnel 457 which is typically of the hot water type. The bag is shrunk into tight conformity with the product packaged therein as the bagged product passes through the shrink tunnel. The shrunk bagged package passes from the shrink tunnel on belt conveyor 456 which passes through the tunnel at a rate assuring a good tight bag on the product. The belt conveyor 456 is aligned with belt conveyor 332 and adjacent to its feed out end. Conveyor 456 delivers the shrunk package to a subsequent conveyor 460 which delivers the package to a suitable place for packing into crates for transporting to the market or for cooling or other processing.

Turning now to a particular operation of the packaging system of my invention in a particular application thereof. The apparatus is first setup and the desired classification set. In a particular exemplary application, poultry products, cleaned and dressed hens ranging in weight from 3 lbs. to 12 lbs. are packaged. It is desired to set the classifier so that 7 lb. to 9 lbs. would be on weight or size with everything over this being oversize and everything under this being undersize. The underweight hens were placed in 9 inch width bags, the on weight in 10 inch wide bags and the overweight in 11 inch wide bags. The equipment is accordingly set up and put into operation. The loading operator then sequentially lifts individual birds chosen at random from a supply, usually in a chilled water bath or the like and places the birds onto a marked area of the timing belt 35 (referring to FIG. 1) at a first work level, the timing belt classifies them while they are passing thereacross. As the birds pass through the electronic eye beam 66 the sensed classification directs the divertor apparatus 32 to proper registration and the bird by gravity feed or movement descends into one of the respective slot channels 125, 126, 127, and 128. If the bird is deposited into intermediate single entrance divided channel 122 (FIG. 5), which becomes channels 126 and 127 it is directed by the gate means 96 and gravity fed into one of the channels 126 and 127 and in passing across a respective signal flap means 116 or 117 reverses the gate for receipt of the next bird delivered to the intermediate channel 122.

The indexed bird then slides down the channel and is retained in the channel until an operator shoves the bird from the upper surface of one of the air dispensing table loading chutes 144 or 145 at the second work level. It will be understood that when the gate is opened, such as is shown at channel 128 at 137, the gravity feed is not of sufficient moment to do any more than convey the next bird in the sequence down onto the loading table 145. Thus, all of the stored birds and other birds being inserted into the chute are gravity fed at a very slow force so that they are neither damaged nor fed down rapidly upon the operator. Taking for example the position represented by table 221, the operator pushes the bird that has come down onto the loading chute surface 195 (FIG. 8) into the bag which is positioned on the loading table 221. The bag on the loading table 221 was already inflated by the blower unit 145. The operator shoves the bird between the guide arms and into a bag keyed to the classification of the bird and following through shoves the bag across the other bags fed up onto the table and allows the bag to proceed across these bags and by gravity feed or movement down unit 313 onto the conveyor belt 331 at a third work level. The conveyor 331 conveys the bagged product to conveyor belt 332. Once the bag is removed from the signalling means 263 (FIG. 9), of course, another bag is indexed into the position on the table 221 and blown open by the blower.

Conveyor 332 feeds the bagged product to the vacuumizing and closing station where an operator standing in position 334 (FIG. 2) lifts the bag upwardly and secures the mouth of the bag around the handle 386 of (FIG. 16) of the nozzle 335. As the operator secures the mouth of the bag around the handle 386 he inserts the tip of the nozzle 385 into the birds' open cavity at the same time. Of course, the first operator loaded the bird into the system with the birds's cavity facing upstream. The operator then pulls down on the nozzle and the continuously rotating plate member 366 moves to engage the nozzle 335 in slot 375 where the nozzle is clamped by clamping means 362. This holds the nozzle in the open position with the bag therearound. The plate 336 continues its rotation and as it rotates cam follower 380 reaches sector 5 where the cam 381 raising the nozzle to provide an empty length of bag between the bird and the nozzle tip 385. The neck of the bag between the top of the bird and the nozzle tip 385 is carried by the plate into clipper throat 404 (FIG. 17). The clipper clips the neck of the bag and the bag is severed substantially simultaneously therewith. The bag falls down onto the belt 332 and is conveyed by belt 332 to belt 460 by which it is fed through a shrink tunnel 457 where the bag is shrunk taut onto the product to form a tight package with an attractive appearance. The package then passes from the shrink tunnel and onto a subsequent conveyor from which it is usually moved to a chilling bath from which it is taken either to temporary storage or directly boxed for shipment to customers. Of course, the operation is substantially exactly the same with any of the other classifications of birds.

While in accordance with the patent statutes, I have described the best mode contemplated by me for carrying out my invention, it will be obvious to those skilled in the art that various changes and modification may be made therein without departing from the present invention and, I therefore aim in the following claims to cover all such equivalent variations as fall within the true spirit and scope of this invention.

I claim:

1. A packaging apparatus for packaging products in bags comprising,

I. at least one classifier, said classifier including
      1. a differentiating means equipped to classify said product input into at least two classifications,
      2. at least two inventory storage means, a respective one of said means corresponding to a respective one of said two classifications,
      3. means diverting said product to a respective one of said inventory storage means in response to its classification,
      4. at least two inventory dispensers, a respective one of said dispensers fed by a respective one of said inventory storage means, said dispensers each have a gate means for alternately retaining and dispensing inventoried products;
   II. a bag loader including
      1. at least two product insertion stations for sequentially receiving bags and product for insertion of said product into said bags, a respective one of said stations for a respective one of said dispensers,
      2. at least two bag positioners, a respective one of said bag positioners positioning bags sequentially in a respective one of said product insertion stations, each of said bag positioners including a dispensing means for dispensing bags for a respective classification,
      3. a reciprocating air blowing means mounted for reciprocation to alternatively service at least said two product insertion stations to open bags received therein and maintain said bags open individually for loading, said air blowing means opening a bag by directing a stream of air across and into the mouth of a bag,
      4. signaling means activated by said air blowing means upon its reciprocation from servicing one product insertion station to servicing the other said product insertion station to switch the inventory dispenser dispensing products to the one product insertion station to retention and the inventory dispenser dispensing products to said other product insertion station to dispensing.

2. A packaging apparatus according to claim 1 wherein the differentiating means has three classifications and the diverting means includes a means indexing three positions selected by response to the differentiating means and wherein said diverter means has an outlet and there is an indexing means at said outlet, said indexing means including one outer position for one classification, an opposite outer position for another classification and an intermediate pair of positions, and a second diverter means reciprocal to open alternately one and then the other of said intermediate positions and at least two of said positions feeding respective ones of said two inventory storage means.

3. A packaging apparatus according to claim 2 wherein the apparatus includes four inventory storage means, each of said inventory storage means fed by a respective one of said outer, said opposite outer and each of said intermediate positions.

4. A packaging apparatus for packaging products in imbricated bags mounted on two spaced apart tapes comprising, I. at least one classifier, said classifier including
      1. a differentiating means equipped to classify said product input into at least two classifications,
      2. at least two inventory storage means, a respective one of said means corresponding to a respective one of said classifications,
      3. means diverting said product to a respective one of said inventory storage means in response to its classification,
      4. at least two inventory dispensers, a respective one of said dispensers fed by a respective one of said inventory storage means,
   II. a bag loader including
      1. at least two product insertion stations for sequentially receiving bags and product for insertion of said product into said bags, a respective one of said stations for a respective one of said dispensers, 2. at least two bag positioners a respective one of said bag positioners positioning bags sequentially in a respective one of said product insertion stations, each of said bag positioners including a dispensing means for dispensing bags for a respective classification, each of said dispensing means is a tape puller and each of said tape pullers includes,
A. a driven gear wheel,
B. an idler gear wheel meshing with said driven gear wheel,
C. a pair of horizontally spaced apart grooved wheels for respectively guiding said tape from the product insertion table to the meshing driven gear wheel and idler gear wheel, said pair of horizontally spaced apart grooved wheels being laterally adjustable to accommodate different spacings of said two tapes,
D. a signaling means responsive to the presence or absence of a bag at said product insertion station, and
E. an indexing means responsive to said signaling means to sequentially activate said driven gear wheel to singly replace bags as they are singly removed from said product insertion station.

5. A packaging apparatus according to claim 4 wherein said apparatus includes a vacuumizing and closing device downstream from said product insertion station, said vacuumizing and closing device having means for vacuumizing and closing the bag and for conveying the bag so prepared to the opposite side of said device from the feed in of said bags and means for feeding said prepared bag from said device, and for conveying said prepared bag, a shrink tunnel downstream from said vacuumizing and closing device, said shrink tunnel having means inside for heating the bag until it is shrunk into tight conformity with the product packaged therein.

6. A packaging apparatus according to claim 4 wherein the differentiating means has three classifications and the diverting means includes a means indexing three positions selected by response to the differentiating means and wherein said diverter means has an outlet and there is an indexing means at said outlet, said indexing means including one outer position for one classification, an opposite outer position for another classification and an intermediate pair of positions, and a second diverter means reciprocal to open alternately one and then the other of said intermediate positions and at least two of said positions feeding respective ones of said two inventory storage means.

7. A packaging apparatus according to claim 6 wherein the apparatus includes four inventory storage means, each of said inventory storage means fed by a respective one of said outer, said opposite outer and each of said intermediate positions.

* * * * *